US006956220B2

(12) United States Patent
Traubenberg et al.

(10) Patent No.: US 6,956,220 B2
(45) Date of Patent: Oct. 18, 2005

(54) FLUID TREATMENT SYSTEM AND RADIATION SOURCES MODULE FOR USE THEREIN

(75) Inventors: George A. Traubenberg, London (CA); Steven M. Bakker, London (CA); Kuang-Ping Chiu, London (CA)

(73) Assignee: Trojan Technologies Inc. (CA)

(*) Notice: Subject to any disclaimer, the term of this patent is extended or adjusted under 35 U.S.C. 154(b) by 167 days.

(21) Appl. No.: 10/464,849

(22) Filed: Jun. 19, 2003

(65) Prior Publication Data

US 2004/0069954 A1 Apr. 15, 2004

Related U.S. Application Data

(60) Provisional application No. 60/389,503, filed on Jun. 19, 2002.

(51) Int. Cl.[7] ........................ G01N 21/01; G01N 21/51; G01N 23/10; G01N 23/12

(52) U.S. Cl. ................... 250/432 R; 250/428; 250/431; 250/435; 250/436; 250/438; 422/22; 422/24; 422/186.3; 422/186.07; 422/906; 210/748; 210/710; 210/542; 210/252; 204/660; 204/671

(58) Field of Search ................................ 250/431, 436, 250/438, 435, 428, 432 R; 422/22, 24, 186.3, 186.07, 906; 210/748, 710, 542, 252; 204/660, 671

(56) References Cited

U.S. PATENT DOCUMENTS

| | | | | | |
|---|---|---|---|---|---|
| 4,367,410 | A | * | 1/1983 | Wood | 250/431 |
| 5,019,256 | A | | 5/1991 | Ifill et al. | |
| 5,937,266 | A | * | 8/1999 | Kadoya | 422/186.3 |
| 2003/0024859 | A1 | * | 2/2003 | Kezele et al. | 210/97 |
| 2003/0024865 | A1 | * | 2/2003 | Kezele et al. | 210/170 |

FOREIGN PATENT DOCUMENTS

| | | | |
|---|---|---|---|
| EP | 0 893 411 | A1 | 1/1999 |
| WO | WO 01/25154 | A1 | 4/2001 |
| WO | WO 02/48050 | A2 | 6/2002 |

* cited by examiner

*Primary Examiner*—John R. Lee
*Assistant Examiner*—Bernard E. Souw
(74) *Attorney, Agent, or Firm*—Katten Muchin Rosenman LLP

(57) ABSTRACT

A radiation source module comprising a support member, a radiation source assembly connected to the support member, the radiation source assembly comprising at least one elongate radiation source having a source longitudinal axis and a module-to-surface seal disposed on a first elongate surface of the module, the first elongate surface comprising a first longitudinal axis transverse to the source longitudinal axis, the seal operable to provide a substantially fluid tight seal between the first surface and a second surface which is adjacent to the first surface. A fluid treatment system employ the radiation source module is also described.

37 Claims, 15 Drawing Sheets

FLUID TREATMENT SYSTEM AND RADIATION SOURCES MODULE FOR USE THEREIN

CROSS-REFERENCE TO RELATED APPLICATION

The present application claims the benefit under 35 U.S.C. §119(e) of provisional patent application Ser. No. 60/389,503, filed Jun. 19, 2002, the contents of which are hereby incorporated by reference.

BACKGROUND OF THE INVENTION

1. Field of the Invention

In one of its aspects, the present invention relates to a radiation source module, particularly an ultraviolet radiation source module. In another of its aspects, the present invention relates to a fluid treatment system, more particularly, an ultraviolet radiation water treatment system.

2. Description of the Prior Art

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

- relatively high capital cost of reactor;
- difficult accessibility to submerged reactor and/or wetted equipment (lamps, sleeve cleaners, etc);
- difficulties associated with removal of fouling materials from fluid treatment equipment; and/or
- full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 Patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open in a free-flowing "top open" channel.

The fluid treatment system taught in the Maarschalkerweerd #1 Patents were characterized by having a free fluid flowing surface (typically the top fluid surface was not purposely controlled or constrained). Thus, the systems would typically follow the behaviour of open channel hydraulics. Since the design of the system inherently comprised a free flowing fluid surface, there were constraints on the maximum flow each lamp or lamp array could handle before either one or other hydraulically adjoined arrays would be adversely affected by changes in water elevation. At higher flows or significant changes in the flow, the unrestrained or free flowing fluid surface would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re36,896 (all in the name of Maarschalkerweerd and all assigned to the assignee of the present invention and hereinafter referred to as the Maarschalkerweerd #2 Patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

Thus, in order to address the problem of having a large number of lamps and the incremental high cost of cleaning associated with each lamp, higher output lamps were applied for UV fluid treatment. The result was that the number of lamps and subsequent length of each lamp was dramatically reduced. This led to commercial affordability of automatic lamp sleeve cleaning equipment, reduced space requirements for the treatment system and other benefits. In order to use the more powerful lamps (e.g. medium pressure UV lamps), the hydraulic loading per lamp during use of the system would be increased to an extent that the treatment volume/cross-sectional area of the fluid in the reactor would significantly change if the reactor surface was not confined on all surfaces, and hence such a system would be rendered relatively ineffective. Thus, the Maarschalkerweerd #2 Patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 Patents was typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

The Maarschalkerweerd #1 and #2 Patents represent significant advances in the art of fluid treatment, particularly ultraviolet radiation treatment of water. Despite these advances, there is still room for improvement. Over time, the technology underlying UV light sources or lamps has advanced. Specifically, lamp manufacturers are developing more powerful lamps which are also more electrically efficient than medium pressure lamps. These more efficient light sources are typically longer in actual length than the medium pressure lamps. In order to utilize such lamps, two problems must be addressed. First, since the lamps are longer, there is the need to be able to readily extract the lamps from the reactors without significantly increasing the cost of the fluid treatment system. Second, with more powerful and longer lamps, there is a danger that bulk fluid velocity could be in excess of what is acceptable in an open channel or free surface hydraulic reactor design.

U.S. patent application Ser. No. 10/014,898 [Traubenberg et al. (Traubenberg)] teaches a fluid treatment system having the advantages of the system described in Maarschalkerweerd #2 patents while being relatively easy to implement in an open channel such as the one set out in the Maarschalkerweerd #1 patents. The radiation source module and fluid treatment system taught by Traubenberg represent a significant advance in the art. Many of the specific embodiments illustrated by Traubenberg relate to a fluid treatment system in which the longitudinal axis of the radiation sources lie substantially parallel to the direction of fluid flow through the fluid treatment system. In some cases, it is desirable to orient the longitudinal axis of the radiation sources substantially transverse to the directional fluid flow through the fluid treatment system, particularly where powerful lamps are used (e.g., lamp power per unit length is greater than 1 W/cm) and/or where many rows of lamps are in hydraulic series.

Thus, it would be desirable to have a radiation source module and fluid treatment system which facilitates use of the relatively recently developed so-called "low pressure, high output" (LPHO) and/or amalgam lamps while allowing for ready extraction of the lamps from the fluid treatment system for servicing and the like, and having the advantages of the fluid treatment system described in the Maarschalkerweerd #2 Patents. It would be particularly advantageous if the fluid treatment system employed one or more radiation source modules capable of being used in a manner whereby the longitudinal axis of the radiation source(s) therein could be aligned substantially transverse (e.g., perpendicular in the horizontal or vertical position) to the direction of fluid flow.

SUMMARY OF THE INVENTION

It is an object of the present invention to provide a novel radiation source module which obviates or mitigates at least one of the above-mentioned disadvantages of the prior art.

It is an object of the present invention to provide a novel fluid treatment system which obviates or mitigates at least one of the above-mentioned disadvantages of the prior art.

Accordingly, in one of its aspects, the present invention provides a radiation source module comprising a support member, a radiation source assembly connected to the support member, the radiation source assembly comprising at least one elongate radiation source having a source longitudinal axis and a module-to-surface seal disposed on a first elongate surface of the module, the first elongate surface comprising a first longitudinal axis transverse to the source longitudinal axis, the seal operable to provide a substantially fluid tight seal between the first surface and a second surface which is adjacent to the first surface.

In yet another of its aspects, the present invention provides a fluid treatment system comprising an open channel for receiving a flow of fluid, at least one radiation source module removably disposed in the channel, a surface of the at least one radiation source module confining fluid to be treated in a closed fluid treatment zone, the radiation source module comprising at least one radiation source assembly having a longitudinal axis disposed substantially transverse to the direction of fluid flow through the fluid treatment zone.

In another of its aspects, the present invention provides a radiation source module comprising a first support member, a second support member opposed to the first support member, at least one radiation source assembly connected to each of the first support member and the second support member and an extension member connected to the first support member to permit the module to be reversibly pivoted into an open channel comprising a flow of fluid.

In another of its aspects, the present invention provides a fluid treatment system comprising an open channel for receiving a flow of fluid, at least one radiation source module disposed in the channel, the radiation source module comprising at least one radiation source assembly having a longitudinal axis disposed substantially transverse to the direction of fluid flow through the fluid treatment zone, the at least one radiation source module being removable from the channel in a plane which includes the direction of fluid flow through the fluid treatment zone.

Thus, the present inventors have discovered a fluid treatment system (and a radiation source module useful therein) having the advantages of the system described in the Maarschalkerweerd #2 Patents while being relatively easy to implement in an open channel such as the one set out in the Maarschalkerweerd #1 Patents. Additionally, the present fluid treatment system facilitates incorporation of multiple banks (e.g., serially disposed) of radiation source modules (e.g., incorporating LPHO-type or other radiation lamp). These radiation source modules (also an aspect of the present invention) may be used in a manner whereby the longitudinal axis of the radiation source(s) therein can be aligned substantially transverse (e.g., perpendicular in the horizontal or vertical position, or otherwise angled with respect) to the direction of fluid flow. Further, the present fluid treatment system allows for closer spacing of radiation sources—this is desirable to treat low grade fluids. Still further, the present fluid treatment system facilitates incorporation of mixers or mixing elements to facilitate fluid treatment. Effectively, in the present fluid treatment system, a radiation source module provides a confining element and is movable between a first, "in use" position wherein fluid flow passing through the fluid treatment system is confined in a relatively closed-cross section, whereas fluid flow substantially upstream and substantially downstream of the confining element is a so-called open flow (i.e., not constrained on all sides), and a second position, "in service" position, where the module may be wholly or partially removed from the flow of fluid to facilitate servicing thereof. Of course, it is possible to incorporate a so-called transition region between the confining element of the fluid treatment system and the open fluid flow (upstream and/or downstream of the confining element of the fluid treatment zone). Such a transition region serves to funnel or otherwise transition the flow of fluid in a manner such that cross-section area of the flow of fluid orthogonal to the direction of fluid flow is: (i) decreased (if the transition region is placed upstream of the confining element of the fluid treatment zone) thereby increasing fluid flow velocity, or (ii) increased (if the transition region is placed downstream of the confining element of the fluid treatment zone) thereby decreasing fluid flow velocity.

Throughout the specification, reference is made to terms such as "closed zone", "closed cross-section" and "constrained". In essence, these terms are used interchangeably and are intended to encompass a structure which effectively surrounds the fluid flow in a manner similar to that described in the Maarschalkerweerd #2 Patents (with particular reference to the fluid treatment zone described therein). In the case of the present fluid treatment system, in one embodiment, the confining element is provided by a combination of adjacently disposed radiation source modules each radiation source module having its own so-called confining element such that, in combination, an overall confining element is provided in the open channel which serves to provide a closed-section of fluid flow in that region of the channel.

Further, as used throughout this specification, the term "module" is intended to encompass a structure capable of being used as a repeating unit in an overall system such as a fluid treatment system. Still further, as used throughout this specification, the term "fluid" is intended to have a broad meaning and encompasses liquids and gases. The preferred fluid for treatment with the present system is a liquid, preferably water (e.g., wastewater, industrial effluent, reuse water, potable water, ground water and the like).

Those with skill in the art will recognize that there is reference throughout the specification to the use of seals and the like to provide a practical fluid seal between adjacent radiation source modules. It will be clear to those of skill in the art that an absolute fluid tight seal is not required to gain the benefits of the present fluid treatment system and that a small amount of leakage may occur (e.g., in the event of such leakage, it is a simple matter to recycle leaked fluid to the flow of fluid to ensure treatment of substantially all of the fluid to a predefined level). Notwithstanding such small amount of leakage, the confining element serves its function, namely to substantially surround, constrain; confine, encase, etc. the flow of fluid in an area in which at least a portion of the radiation sources are disposed.

BRIEF DESCRIPTION OF THE DRAWINGS

Embodiments of the present invention will be described with reference to the accompanying drawings, wherein like numerals designate like elements, and in which.

DETAILED DESCRIPTION OF THE PREFERRED EMBODIMENTS

Figure 1:
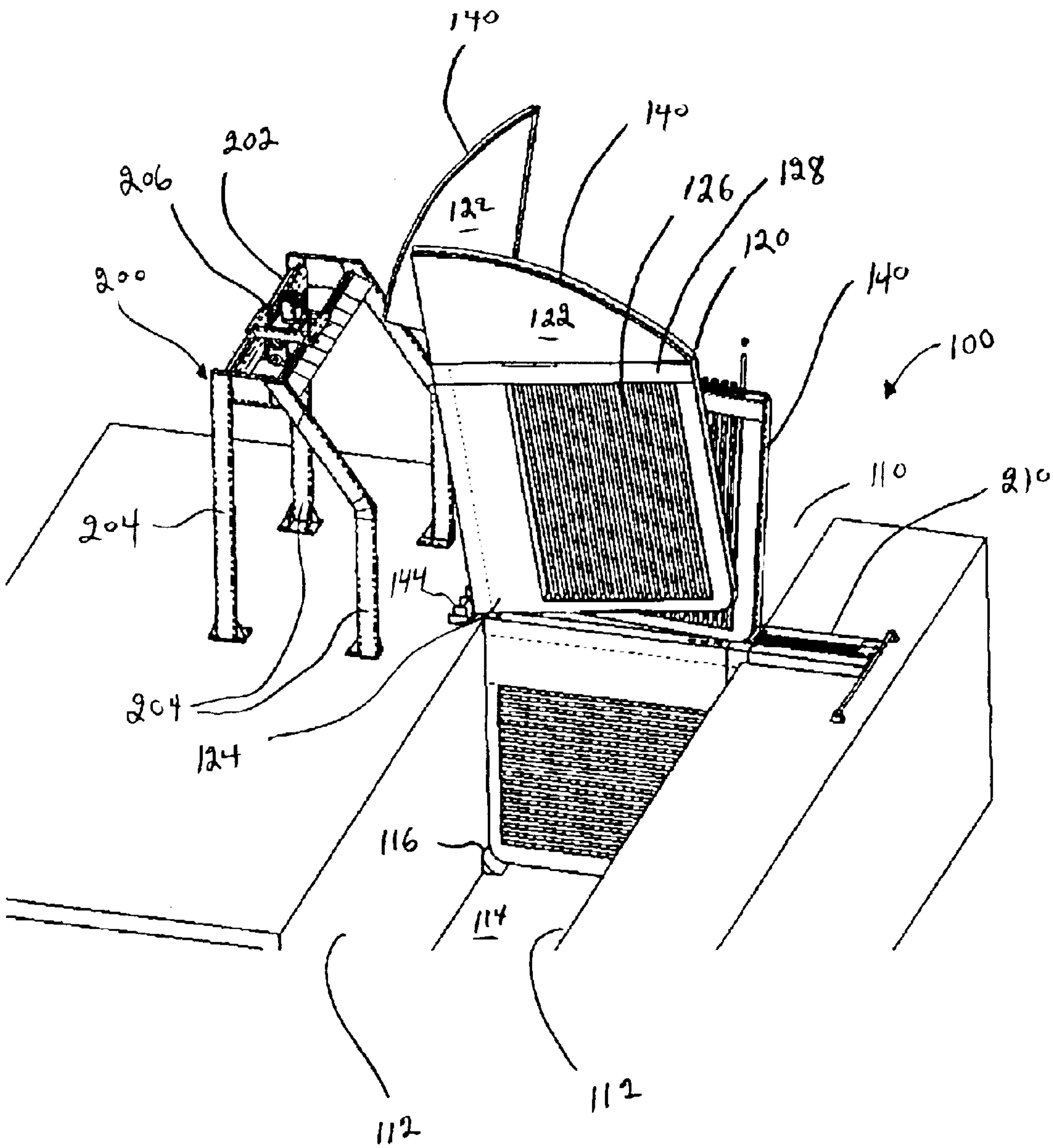
FIG. 1 illustrates a first perspective view of a first embodiment of the present radiation source module and fluid treatment system.

With reference to FIGS. 1–4, there is illustrated a fluid treatment system 100. Fluid treatment system 100 comprises an open channel 110. Open channel 110 comprises a pair of side walls 112 interconnected by a floor 114. Open channel 110 is adapted: to receive a flow of fluid, typically a gravity fed flow of fluid such as effluent from a municipal wastewater treatment plant, an industrial wastewater treatment plant; to provide treatment at a municipal drinking water treatment plant; and the like.

Disposed in open channel 110 are a number of radiation source modules 120. Each radiation source module 120 comprises a bulkhead 122 attached to a frame 124. As shown, particularly in FIGS. 1 and 3, bulkhead 122 may be pivoted with respect to frame 124. Also disposed within frame 124 are a number of radiation source assemblies 126. While the specific details of each radiation source assembly 126 are not illustrated, each radiation source assembly comprises a radiation transparent protective sleeve which may be single open ended or double open ended. Typically the radiation transparent protective sleeve will be made from quartz and the like. Disposed within each protective sleeve is at least one radiation source such as a LPHO ultraviolet radiation lamp or the like. Radiation source module 120 will be discussed hereinbelow with reference to FIG. 2.

As illustrated in FIG. 1, each radiation source module 120 is disposed in channel 110 such that the longitudinal axis of each radiation source assembly 126 lies transverse (i.e., in the illustrated embodiment, the longitudinal axis of each radiation source assembly lies horizontal and perpendicular) to the direction of fluid flow through channel 110.

Fluid treatment system 100 further comprises a module extraction device 200 on one side of channel 110. Module extraction device 200 comprises a frame 202 supported by a number of legs 204. A retraction device 206 is mounted on frame 202 and can be moved back and forth along frame 202 so that the retraction device 206 may be placed in substantial alignment with a particular radiation source module of interest. The precise selection of retraction device 206 is not particularly restricted and may include electric winches and the like.

Disposed on another side of channel 110 is one or more receptacles 210 for receiving bulkhead 122 of each radiation source module 120. In other words, a single receptacle 210 may be employed to received each bulkhead from the collection of radiation source modules 120 or individual receptacles 210 may be employed, each receptacle 210 receiving a bulkhead 122 from a single radiation source module 120.

As illustrated in FIG. 1, when radiation source module 120 is disposed in the "in use" position, the lower corer of frame 124 distal to bulkhead 122 abuts a corner sealing block 116.

Figure 2:
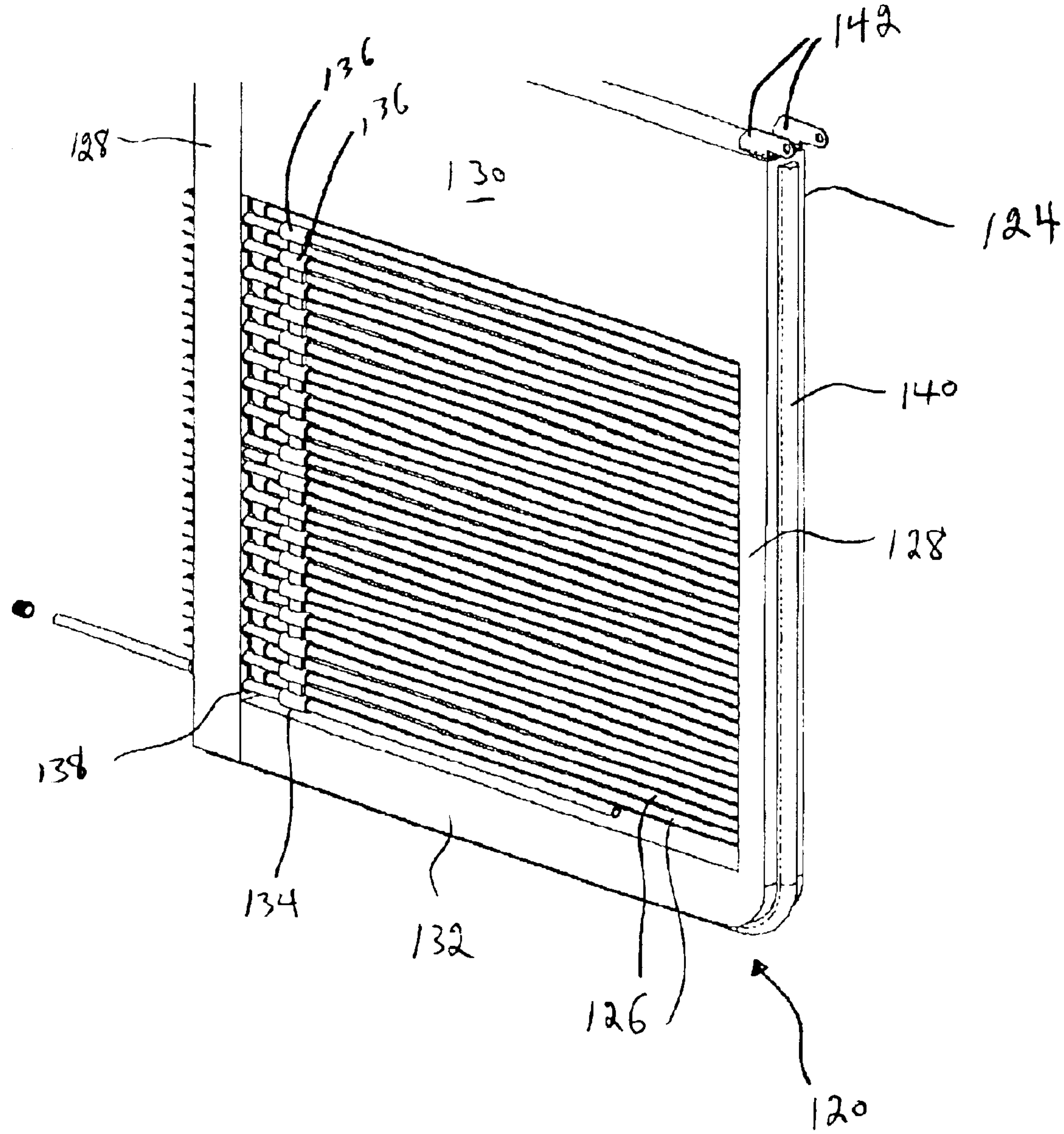
FIG. 2 illustrates an enlarged perspective view of a portion of the radiation source module illustrated in FIG. 1.
Figure 3:
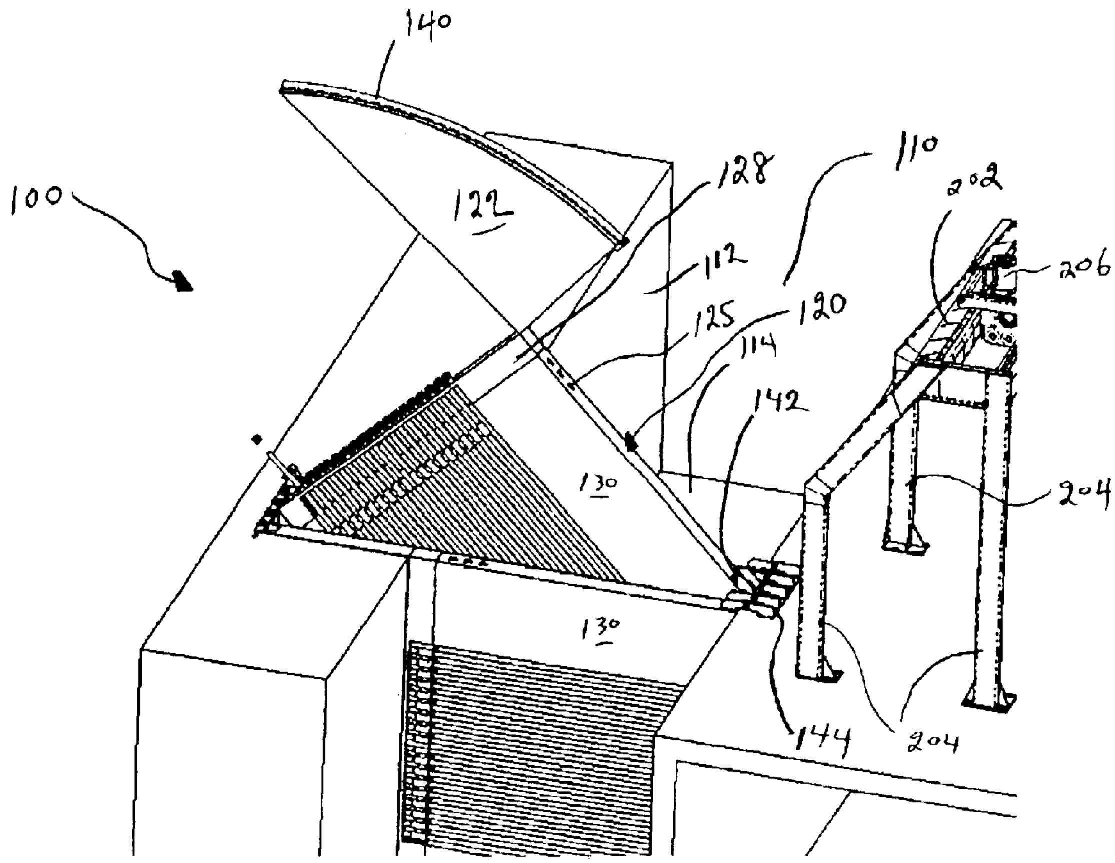
FIG. 3 illustrates a second perspective view of the radiation source module and fluid treatment system illustrated in FIG. 1.
Figure 4:
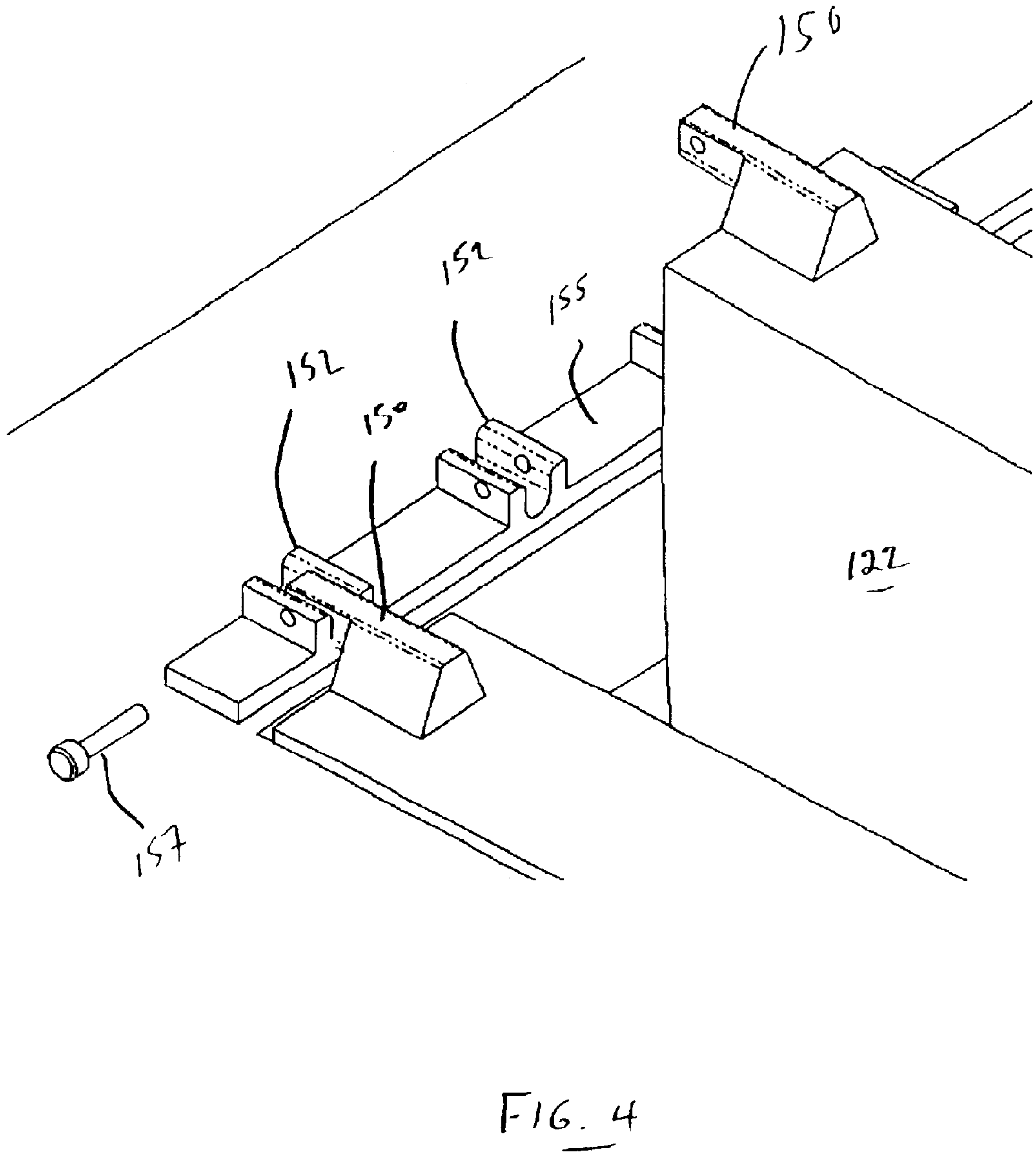
FIG. 4 illustrates an enlarged view of a lock-down system for maintaining the radiation source module illustrated in FIGS. 1–3 in an "in use" position.

With particular reference to FIG. 2, there is illustrated an enlarged view of radiation source module 120 illustrated in FIGS. 1, 3 and 4. Thus, radiation source module 120 comprises a pair of legs 128 connected to one another by a top cross-piece 130 and a bottom cross-piece 132. Thus, the combination of legs 128, top cross-piece 130 and bottom cross-piece 132 define frame 124.

Disposed between and supported by legs 128 are a number of radiation source assemblies 126. In the illustrated embodiment, radiation source assemblies 126 are arranged to lie horizontally in two vertical rows and thus, radiation source module 120 may be regarded as a so-called "twinned" radiation source module (e.g., a twinning of two single radiation source modules to provide a double vertical row of radiation source assemblies in a single module). Of course those of skill in the art will recognize that alternatives to the "twinned" radiation source module are possible.

With further reference to FIG. 2, a cleaning device 134 is provided between legs 128. Cleaning device 134 comprises a number of cleaning sleeves 136, each cleaning sleeve 136 covering a portion of the exterior of a radiation source assembly 126. Cleaning device 134 may be moved back and forth between legs 128 to remove fouling materials from the exterior of radiation source assemblies 126. The precise nature of cleaning device 134 is not particularly restricted. For example, the cleaning device may be one of the cleaning devices described in the Maarschalkerweerd #2 Patents, U.S. Pat. No. 5,539,209, International Publication Number WO 00/26144 [Pearcey et al.], International Publication Number WO 00/00192 [Traubenberg et al.], International Publication Number WO 00/00617 [Dall'Armi et al.], International Publication Number WO 01/12560 [Fang et al.] and the like.

In a preferred embodiment, one or both of legs 128 comprise a receptacle 138 for receiving a least a portion of cleaning device 134 when the latter is in a parked or "not in use" position.

In the embodiment of radiation source module 120 illustrated in FIG. 2, bulkhead 122 is not illustrated. When bulkhead 122 is moved away from frame 124 (FIG. 1), it is possible to access radiation source assemblies 126 for servicing thereof (e.g., to change the radiation source, seals, etc. in radiation source assembly 126 and the like).

Disposed on leg 128 which is opposite to bulkhead 122 is a seal 140. Seal 140 continues along lower cross-piece 132 and the outer edge bulkhead 122 which contacts open channel 110 (FIG. 1). It is highly preferred to contour the shape of receptacle(s) 210 to complement the shape bulkhead 122 thereby improved the fluid seal between the two elements Radiation source module 120 further comprises a pair of pivot arms 142.

With reference to FIGS. 1–4, operation of fluid treatment system 100 will now be described.

Thus, radiation source modules 120 are disposed in channel 110 such that the longitudinal axis of radiation source assemblies 126 lies transverse (in the illustrated embodiment, the longitudinal axis of radiation source modules lies horizontal and perpendicular) with respect to the direction of fluid flow through channel 110. Specifically, radiation source modules 120 are mounted in channel 110 by connecting pivot arms 142 to a suitable connection block 144 mounted on the side of channel 110. Further, a lock-down arm 150 is provided at the top of each bulkhead 122. Thus, when bulkhead 122 is swung to abut leg 128, bulkhead 122 will clear receptacle 210 thereby allowing radiation source assemblies 126 to lie substantially transverse to the direction of fluid flow through channel 110. Lock-down arm 150 of each radiation source module 120 may then be connected to a lock-down receptacle 152 mounted on a connection strip 155 via a latching pin 157—see FIG. 4. This connection system serves to retain radiation source module in place during fluid treatment.

When it is desired to service a radiation source module 120, module retraction device 206 is generally aligned with the module to be extracted. A retraction cable (not shown) is attached to a distal portion of top cross-piece 130. Latching pin 157 for the radiation source module of interest is withdrawn from connection receptacle 152. Preferably, a movable grate (not shown) is disposed over the portion of receptacle(s) 210 left exposed by withdrawal of radiation source module 120. Next, module retraction device 206 is actuated to retract the cable thereby pivoting the radiation source module of interest about the pivot defined at the connection of pivot arms 142 to connection block 144. A safety restraining chain (not shown) can be attached between frame 202 and a chain link holder 125 (those of skill in the art will recognize that a multiplicity of chain link holders 125 may be provided on an upper surface of radiation source module 125 to allow for a variable lifting/securing angle of radiation source module 120). Next, bulkhead 122 may be swung away from adjacent leg 128 of radiation source module 120 to expose radiation source assemblies 126 for service. Once service is complete, the radiation source module may be returned to channel 110 by reversing the foregoing steps.

By this arrangement, there is defined a substantially closed cross-section fluid treatment zone which is similar to the design of the fluid treatment zone in the Maarschalkerweerd #2 Patents. The difference here is that a surface of the closed fluid treatment zone is defined by a removable radiation source module and the radiation source module comprises relatively long radiation sources.

Figure 5:
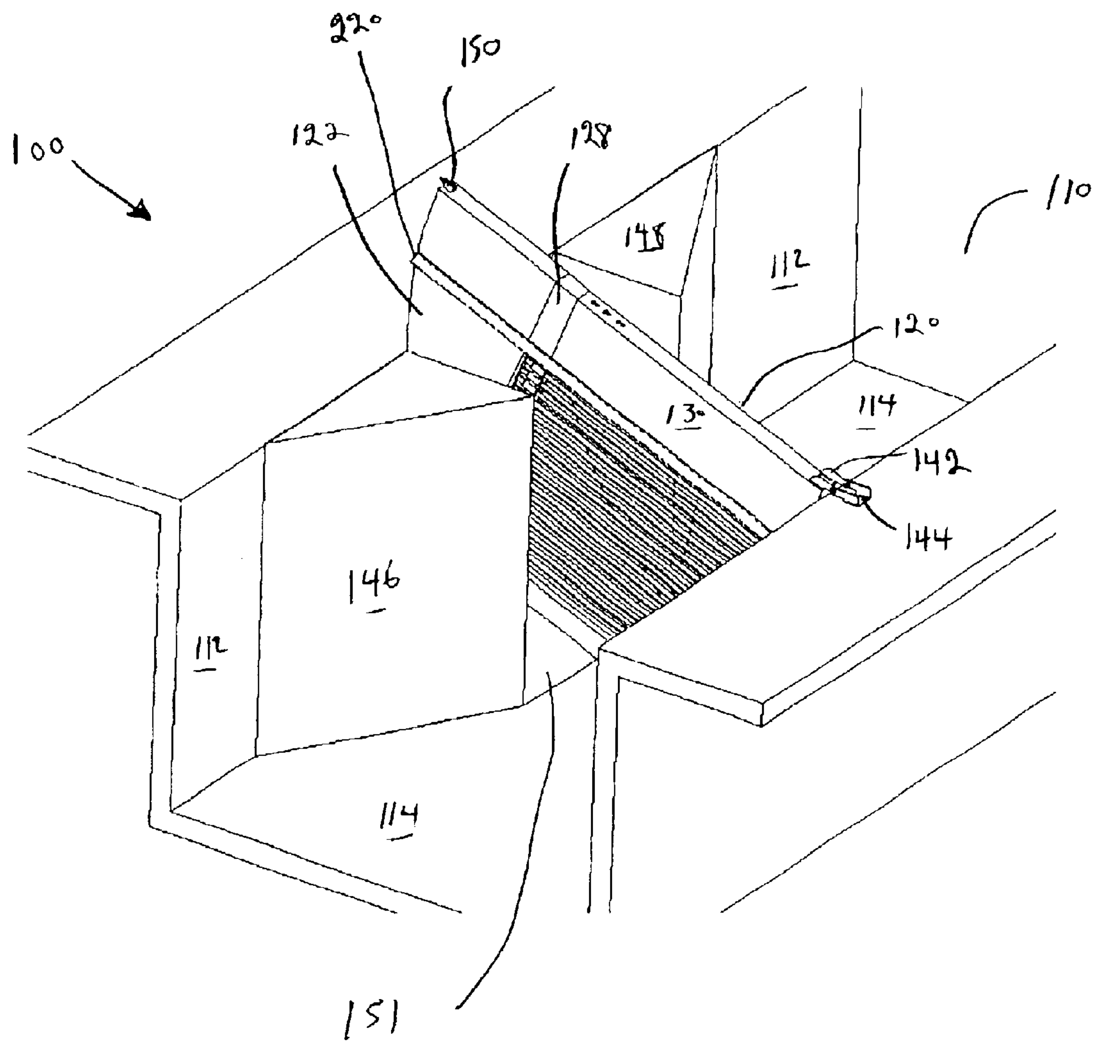
FIG. 5 illustrates a perspective view of second embodiment of the present radiation source module and fluid treatment system.

With reference to FIG. 5, there is illustrated a modification of fluid treatment system 100 illustrated in FIGS. 1–4. Specifically, there are two modifications.

First, receptacle(s) 210 in fluid treatment system 100 has been replaced with an upstream flow diverter 146 and a downstream flow diverter 148. This allows bulkhead 122 to be obscured from the flow of fluid through fluid treatment system 100 when radiation source module 120 is placed in the "in-use" position, wherein the distal edge of bulkhead 122 will nest snugly against a complementary shaped portion 151 of open channel 110. This approach obviates modification of channel 110 to include receptacle 210 shown in FIGS. 1 and 3. In this embodiment, an alternative to using upstream flow diverter 146 and downstream flow diverter 148 is to use one or more transition regions as discussed above to funnel or otherwise transition the flow of fluid in a manner such that cross-section area of the flow of fluid orthogonal to the direction of fluid flow is altered upstream and/or downstream (discussed in more detail above) of radiation source modules 120.

Figure 6:
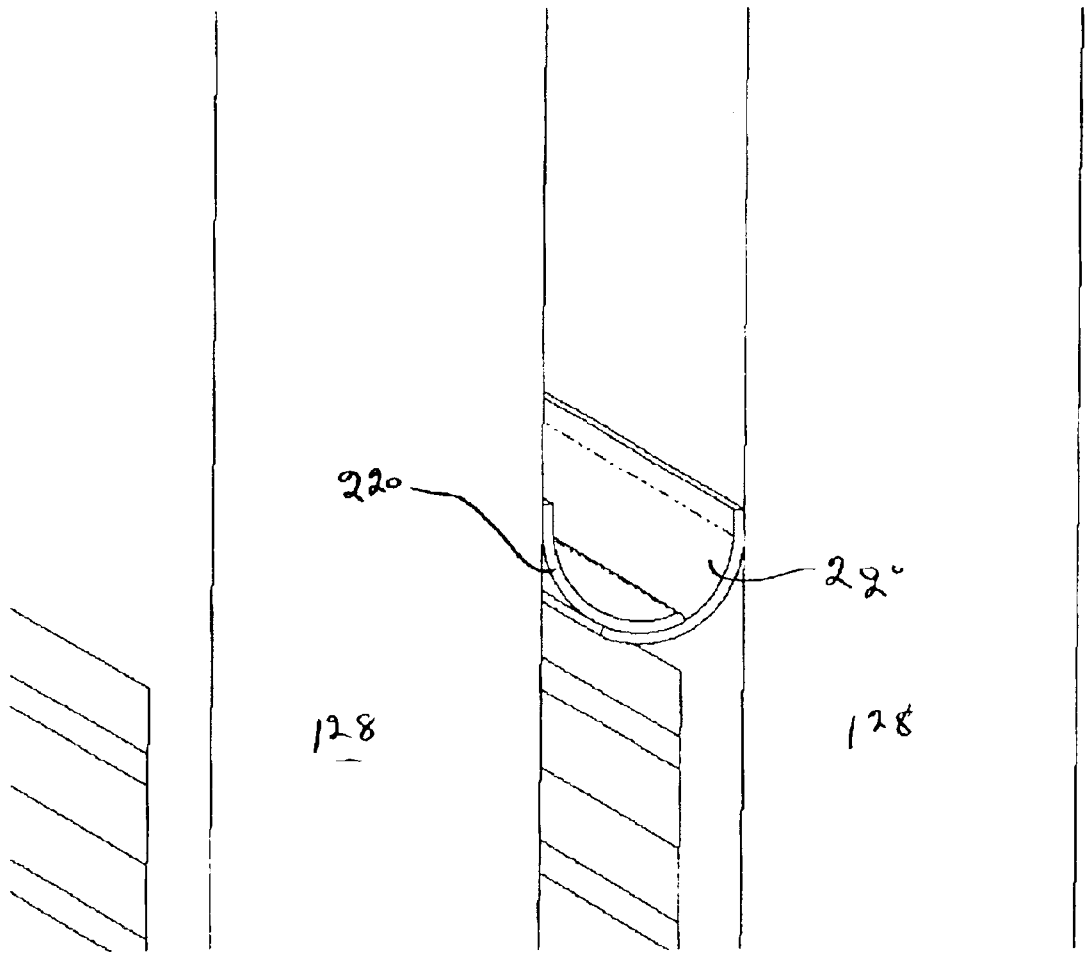
FIGS. 6 and 7 each illustrate an enlarged perspective view of a hydrostatic seal arrangement employed in radiation source module illustrated in FIG. 5.
Figure 7:
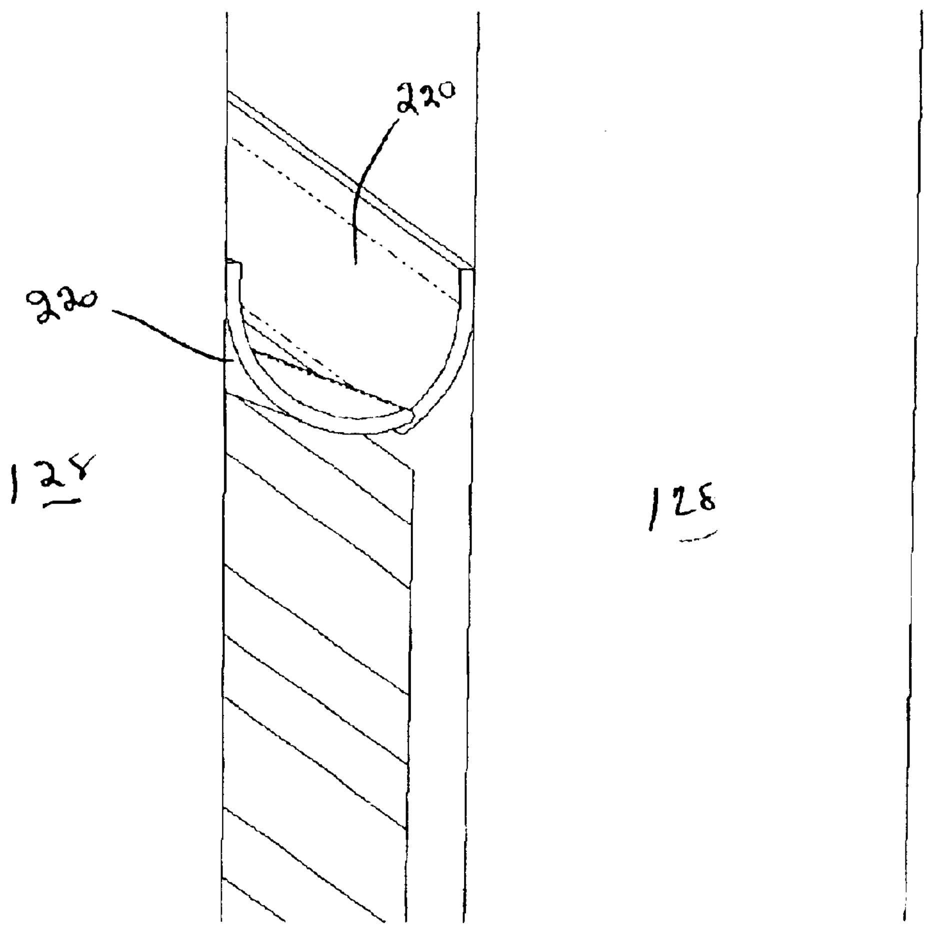

Second, radiation source module 120 has been modified to include one-half of a hydrostatic seal 220. Hydrostatic seal 220 is illustrated in more detail in FIGS. 6 and 7 which shows legs 128 of adjacent radiation source modules 120. As illustrated, a hydrostatic seal 220 is attached along the length of top cross-piece 130 through to the distal edge of bulkhead 122. When adjacent radiation source modules 120 are correctly positioned, a flap portion hydrostatic seal 220 from each of adjacent surfaces of top cross-piece 130 will cooperate to form a substantially fluid tight seal as the level of fluid rises to contact hydrostatic seals 220. In other words, the flap portion from the pair of hydrostatic seals 220 cooperate to form an area of overlap which provides a substantially fluid tight seal—this is illustrated in FIG. 6. When the fluid level recedes and/or one of the modules is moved out of position with respect to the other module (e.g., for servicing and the like), the hydrostatic seal is broken in that the two adjacent seals 220 no longer form an area overlap along their entire length—this is illustrated in FIG. 7. The cooperation of a pair of adjacent hydrostatic seals 220 also serves to: (i) provide a radiation (e.g., light) lock—this can be particularly advantageous to prevent leakage of radiation when high power radiation sources are used, and (ii) obviate or mitigate short circuiting of fluid allowing such fluid to by-pass treatment (at least relatively) by the radiation sources in radiation source modules 120.

As will be appreciated by those of skill in the art, the upstream surface of top cross-piece 130 of the most upstream module need not contain a hydrostatic seal 220. Further, the downstream face of top cross-piece 130 of the most downstream radiation source module need not contain hydrostatic seal 220.

With further reference to FIG. 5, radiation source module 120 illustrated therein may be extracted for service in a manner similar to that described hereinabove with respect to FIGS. 1–4.

Figure 8:
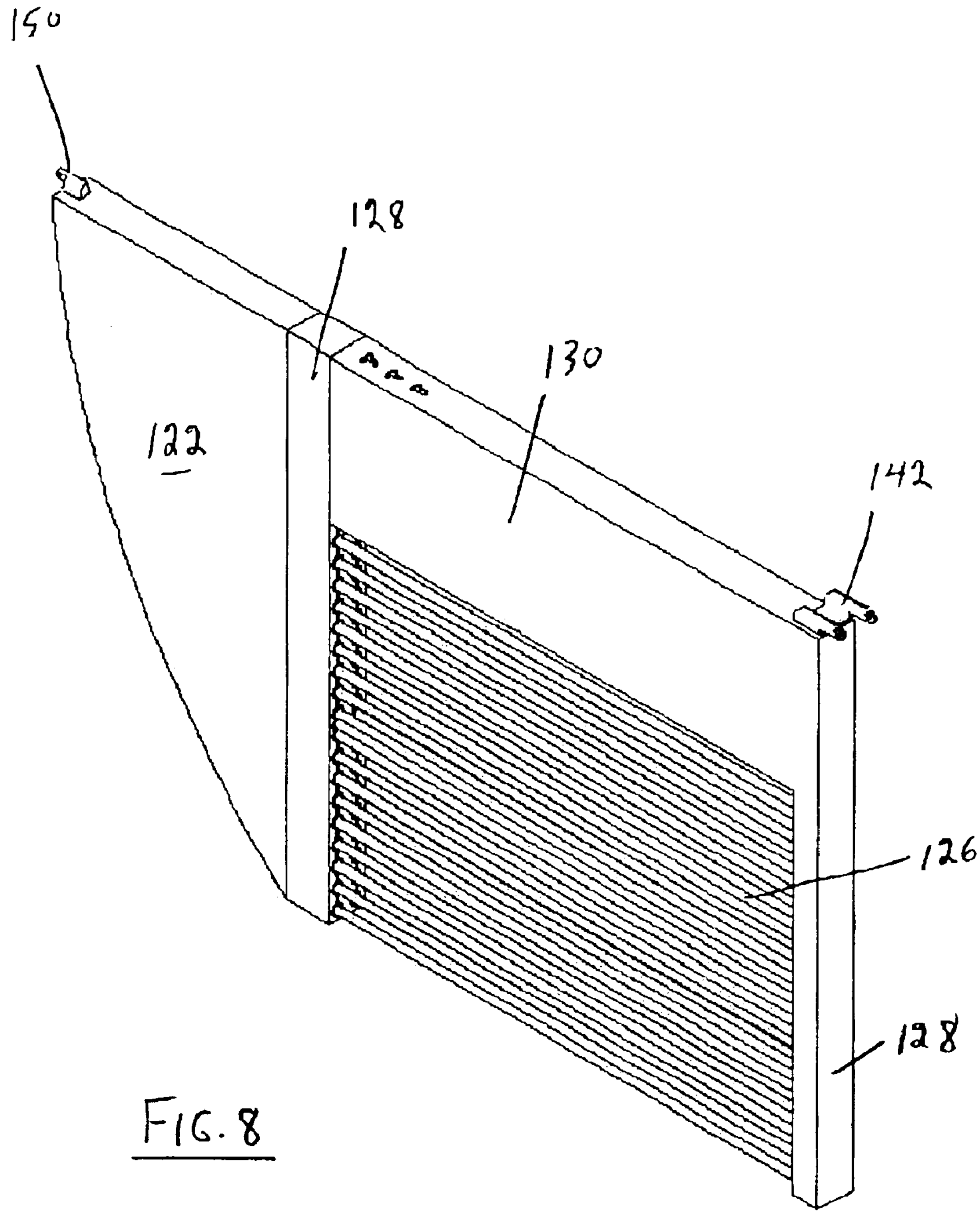
FIG. 8 illustrates a perspective view of a third embodiment of the present radiation source module.

With reference to FIG. 8, there is illustrated a modification of radiation source module 120 illustrated and described with reference to FIGS. 1–7. Specifically, in FIG. 8, bottom cross-piece 132 of frame 124 has been omitted. Further, while not shown for clarity, seal 140 would be disposed on the outer edge of bulkhead 122 (as illustrated in FIGS. 1–4) and the outer vertical edge of distal leg 128 (again as illustrated in FIGS. 1–4).

With reference to FIGS. 9–12, there is illustrated a further modification of radiation source module 120 illustrated in FIGS. 1–7. Specifically, there is illustrated the radiation source module 120*a* having a bulkhead 122*a* which is fixedly attached to leg 128.

Radiation source module 120*a* further comprises a deflector plate 160 disposed between the vertical rows of radiation source assemblies 126. Deflector plate 160 can be used in place of receptacles 138 illustrated in FIG. 2. Deflector plate 160 comprises a series of receptacles each of which receive a portion of the entire periphery of cleaning sleeves 136. Deflector plate 160 serves to direct fluid flow past the arc length of radiation sources (not shown for clarity) disposed in radiation source assemblies 126.

Figure 9:
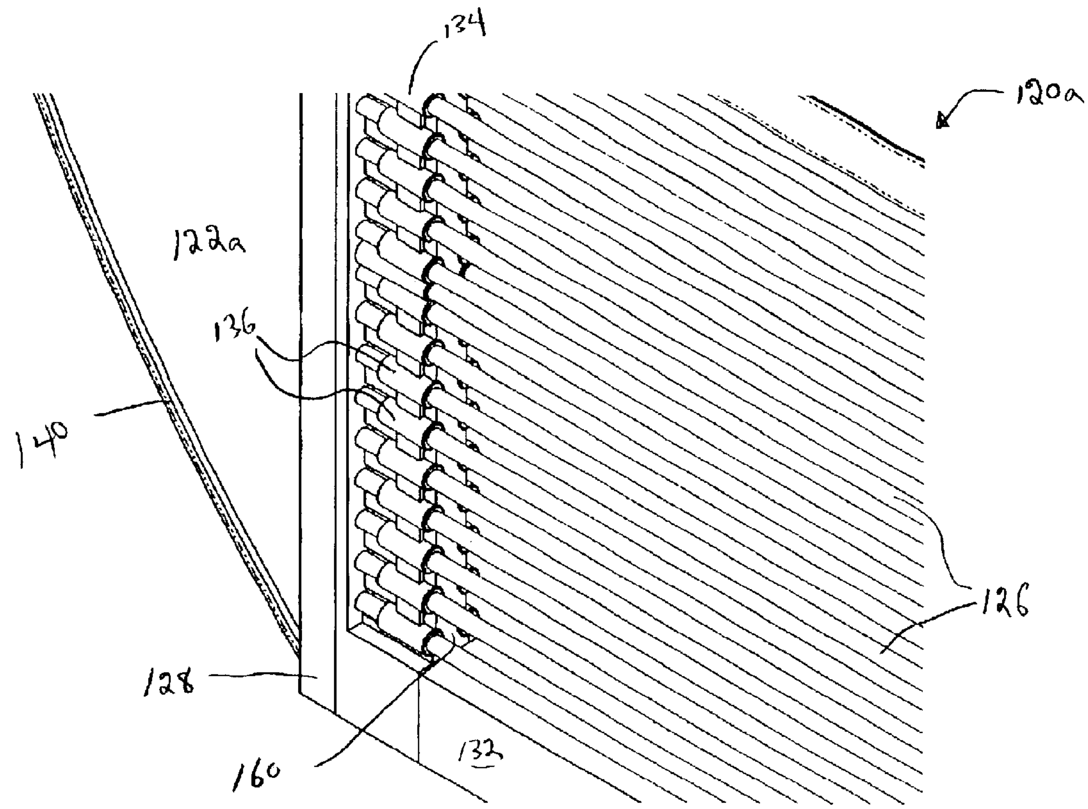
FIG. 9–11 illustrate various perspective views of a fourth embodiment of the present radiation source module.
Figure 10:
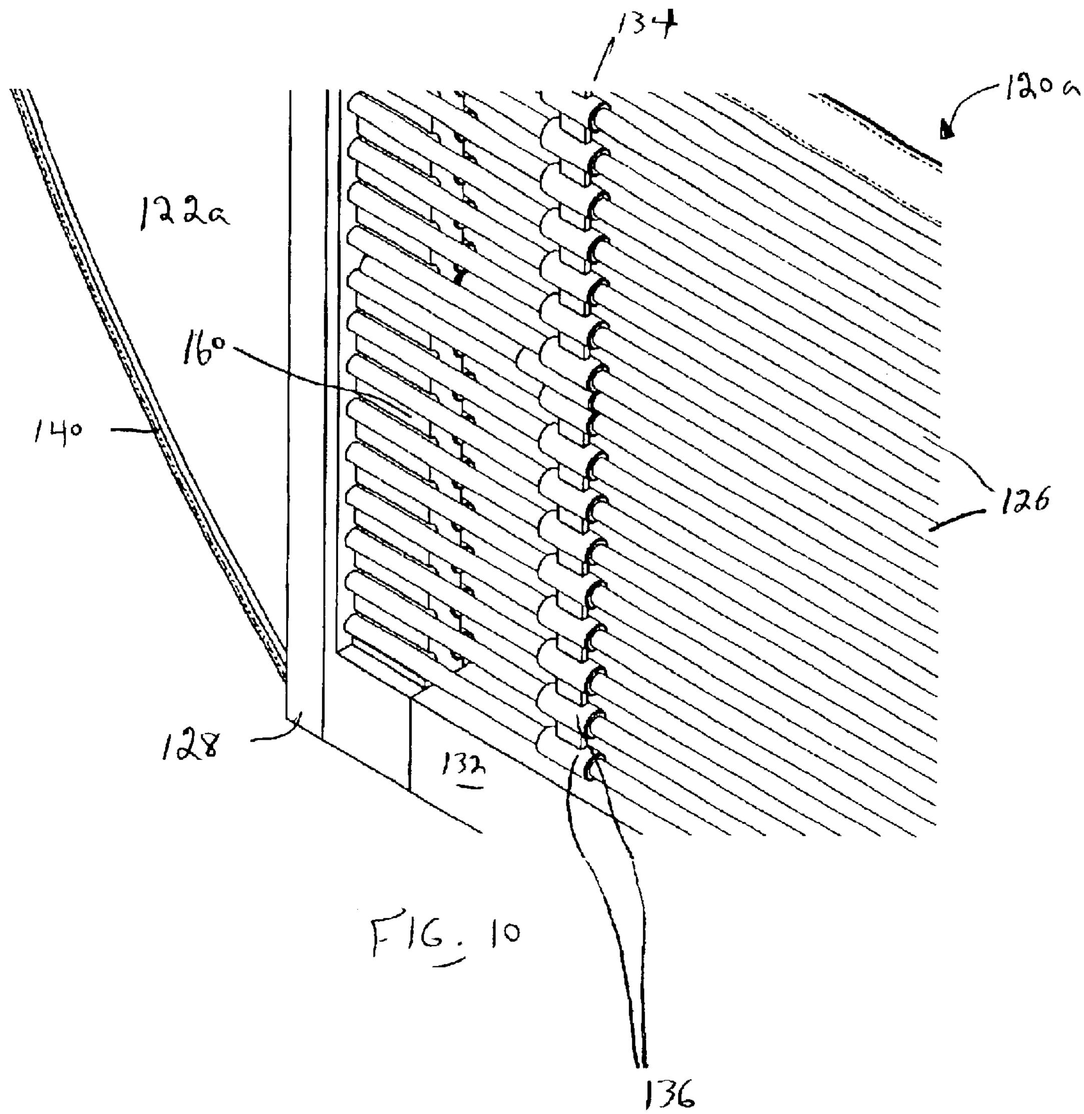
Figure 11:
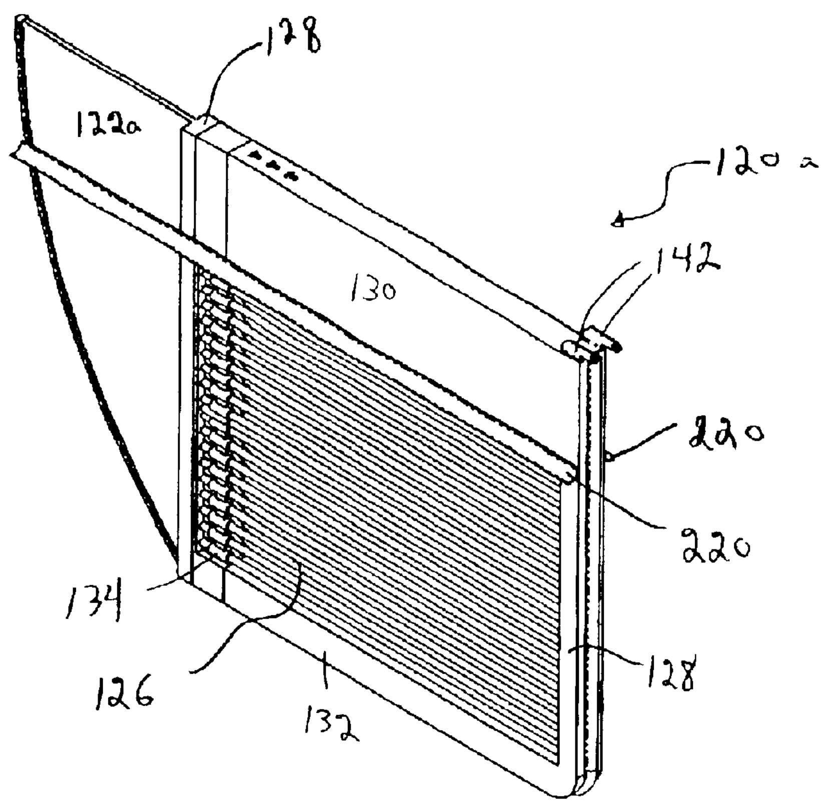

With reference to FIGS. 9 and 10, FIG. 9 illustrates cleaning device 134 in the parked position wherein cleaning sleeves 136 are adjacent deflector plate 160 whereas FIG. 10 illustrates cleaning device 134 being moved along the exterior of radiation source assemblies 126 to remove fouling materials from the exterior of the latter.

Figure 12:
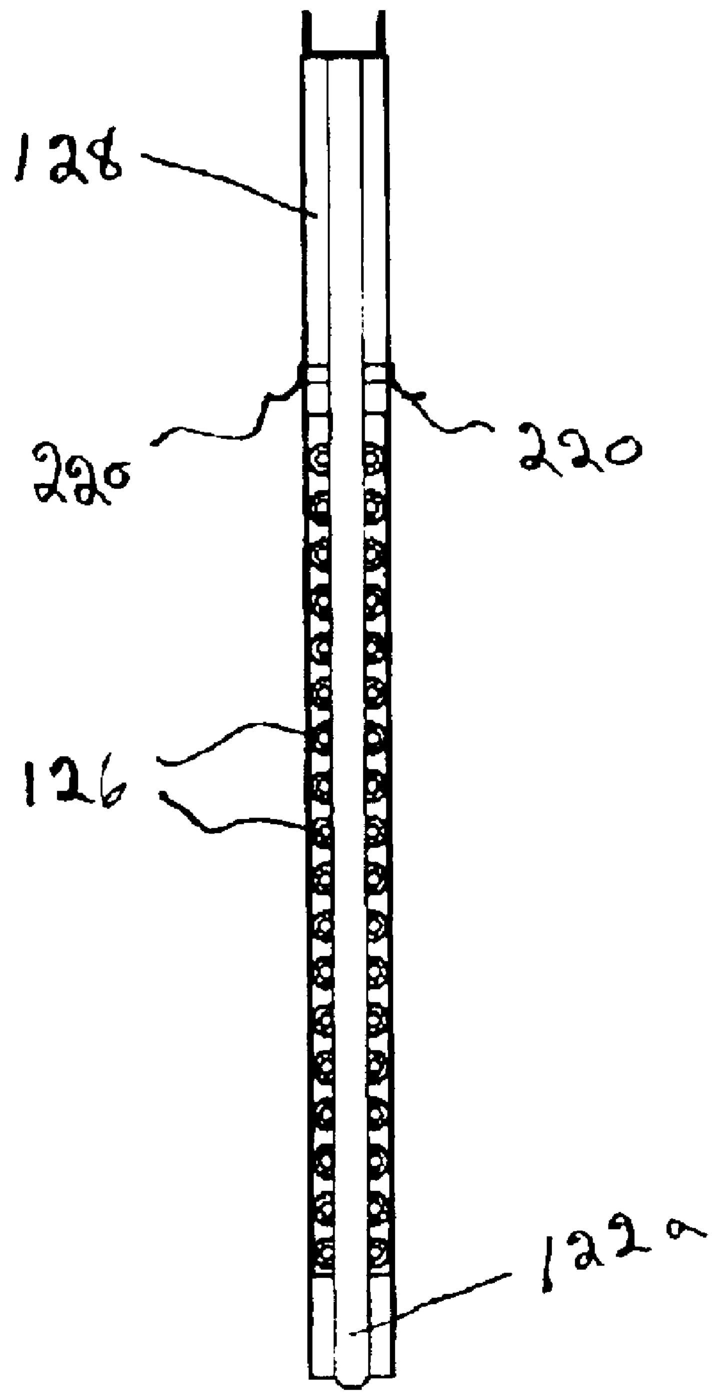
FIG. 12 illustrates a front view of the radiation source module illustrated in FIGS. 9–11.

FIG. 12 illustrates and end on view of radiation source module 120*a*. From FIG. 12, it will be appreciated that leg 128 which is intricately formed with bulkhead 122*a* comprises a series of apertures allowing access to radiation source assemblies 126. These apertures may be sealed with the conventional coupling nut/O-ring arrangement or any similar means.

Figure 13:
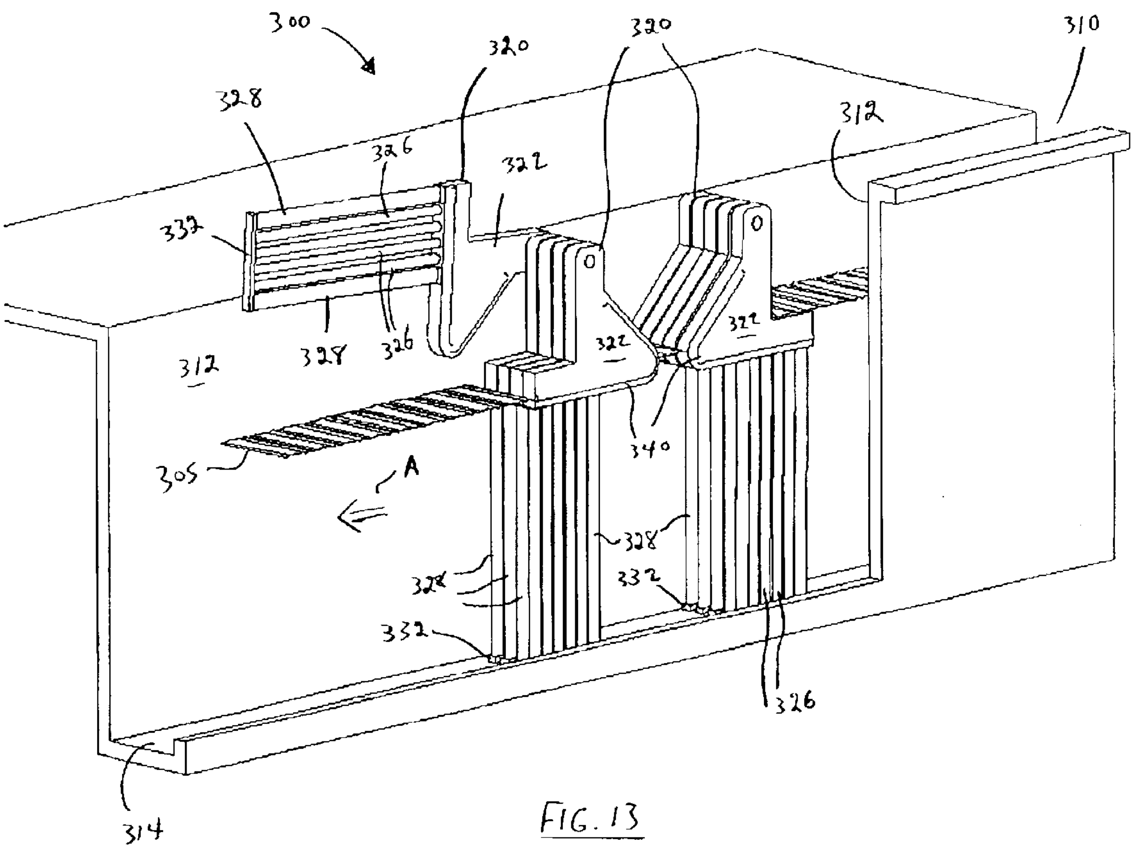
FIG. 13 illustrates a perspective view of a fifth embodiment of the present radiation source module shown in an open channel (partially cut away) of fluid flow.

With reference to FIG. 13, there is illustrated a fluid treatment system 300. Fluid treatment system 300 comprises an open channel 310. Open channel 310 comprises a pair of side walls 312 interconnected by a floor 314. Open channel 310 is adapted to receive a flow of fluid 305 which may be similar to the flow of fluid described above with reference to FIGS. 1–4.

Disposed in open channel 310 are a number of radiation source modules 320. Each radiation source module 320 comprises a bulkhead 322. Radiation source module 320 further comprises a pair of legs 328 connected to bulkhead 322 at one end thereof and to a bottom cross-piece 332 at the other end thereof. Thus, the combination of legs 328, bulkhead 322 and bottom cross-piece 334 define a frame. Disposed between and connected to bulkhead 322 and bottom cross-piece 332 are a series of radiation source assemblies 326 which are similar in design and operation to radiation source assembly 126 discussed above with reference to FIGS. 1–4.

As illustrated in FIG. 13, each radiation source module 320 is disposed in channel 310 such that the longitudinal axis of each radiation source assembly 326 lies transverse (i.e., in the illustrated embodiment, the longitudinal axis of each radiation source assembly lies vertical and perpendicular) to the direction (arrow A) of fluid flow 305 through channel 310.

Disposed on a portion of bulkhead 322 is a seal 340 which functions in a manner similar to seal 140 discussed above with reference to FIGS. 1–4. Seal 340 can be positioned on bulkhead 322 to contact a seal on an adjacent radiation source module or there can be a offset between these seals, effectively to create a double sealing mechanism. Either embodiment will be suitable for using radiation source modules 320 in fluid treatment system 300.

A particularly unique feature of the embodiment of fluid treatment system 300 illustrated in FIG. 13 is that it provides a system whereby the radiation source assemblies are disposed such that their longitudinal axis is transverse to the direction of fluid flow through the system in combination with a radiation source module which may be pivotally extracted in a plane which contains the direction of fluid flow through the fluid treatment system.

A number of advantages accrue from such an arrangement. First, it is possible to use a deeper channel since the radiation source assemblies tend to be longer. This can result in an increase in the volume of fluid being treated. Second, in some cases, it may be easier to retrofit fluid treatment system 300 into an existing channel since no modification of channel 310 is required to accommodate extraction of radiation source modules 320.

With further reference to FIG. 13, it will be seen that there is a small gap between the respective bullheads 322 of the adjacent banks of radiation source modules 320. Thus, in this gap, there is an open flow of fluid. It will, however, be understood by those of skill in the art, there is no specific need for such a gap and/or for the open flow of fluid between the banks of radiation source modules 320 illustrated in FIG. 13. For example, it is possible to have the banks of radiation source modules disposed in a maimer whereby the respective upstream end of bulkheads 322 on one bank abuts and forms a substantially fluid tight seal with the downstream end of bulkheads 322 of the other bank of modules. An alternative to this would be to have a confining element independent of the two banks of radiation source modules 320, the confining element being disposed between walls 312 of open channel 310. Bulkheads 322 of each bank of radiation source modules 320 would then abut this confining element and form a substantially fluid tight seal therewith. Other variations will be apparent to those of skill in the art.

Figure 14:
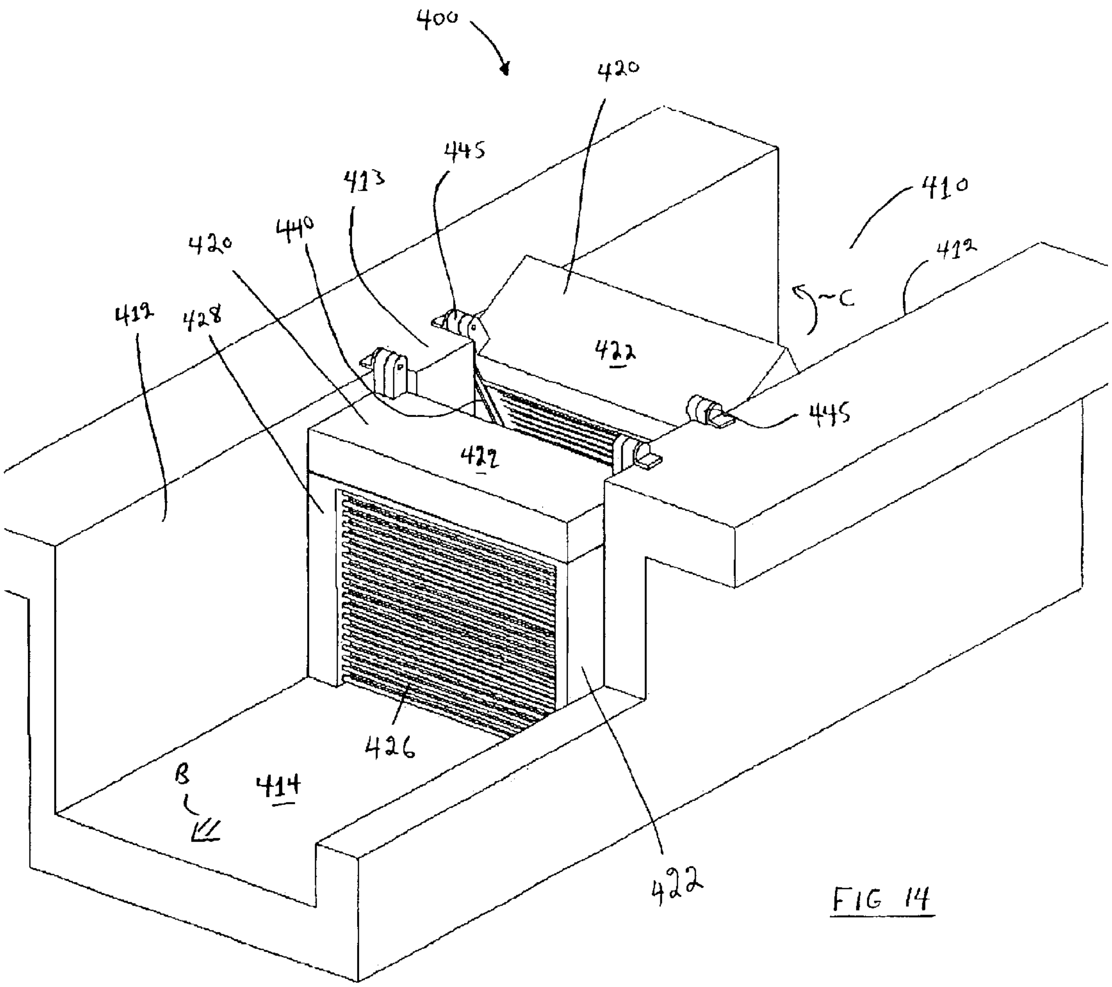
FIG. 14 illustrates a perspective view of a sixth embodiment of the present radiation source module shown in an open channel (partially cut away) of fluid flow.

With FIG. 14, there is illustrated a fluid treatment system 400. Fluid treatment system 400 comprises an open channel 410. Open channel 410 comprises a pair of sidewalls 412 interconnected by a floor 414. Open channel 410 is adapted to receive a flow of fluid which may be similar to the flow of fluid described above with reference to FIGS. 1–4. One of sidewalls 412 comprises a jut 413.

Disposed in open channel 410 are a pair of radiation source modules 420. Each radiation source module 420 comprises a pair of legs 428 which are interconnected by a cross-piece 422. Thus, the combination of legs 428 and cross-piece 422 define a frame. Disposed between and connected to legs 428 are a series of radiation source assemblies 426 which are similar in design and operation to radiation source assembly 126 discussed above with reference to FIGS. 1–4. Radiation source assemblies 426 may be column or in a twinned or otherwise multiple-column orientation as described above.

As illustrated in FIG. 14, each radiation source module 420 is disposed in channel 410 such that the longitudinal axis of each radiation source assembly 426 lies transverse (i.e., in the illustrated embodiment, the longitudinal axis of each radiation source assembly lies horizontal and perpendicular) to the direction (arrow B) of fluid flow through channel 410. Disposed on leg 428 which is adjacent to jut 413 is a seal 440 which functions in a manner similar to seal 140 discussed above with reference to FIGS. 1–4. Thus, when radiation source module 420 is oriented in the "in use" position, seal 440 on leg 428 combines with jut 413 to form a substantially fluid tight seal. Further, it is preferred to have another seal (not shown) on the outside of the other leg 428 so that, effectively, a seal is provided between each leg 428 and sidewall 412 or a portion (e.g., jut 413) thereof.

When radiation source module 410 is oriented in the "in use" position, cross-piece 422 functions as a confining element to define a closed cross-section to fluid conveyed past radiation source assemblies 426 which are positioned beneath cross-piece 422.

When it is desirable to service radiation source module 420, it may be pivoted in the direction of arrow C via hinge connections 445 at opposed sides of cross-piece 422.

With further reference to FIG. 14, it will be seen that there is a small gap between respective radiation source modules 420. This gap is similar to the gap discussed hereinabove with reference to FIG. 13. The discussion of the gap with reference to FIG. 13 above applies equally to the embodiment shown in FIG. 14.

Figure 15:
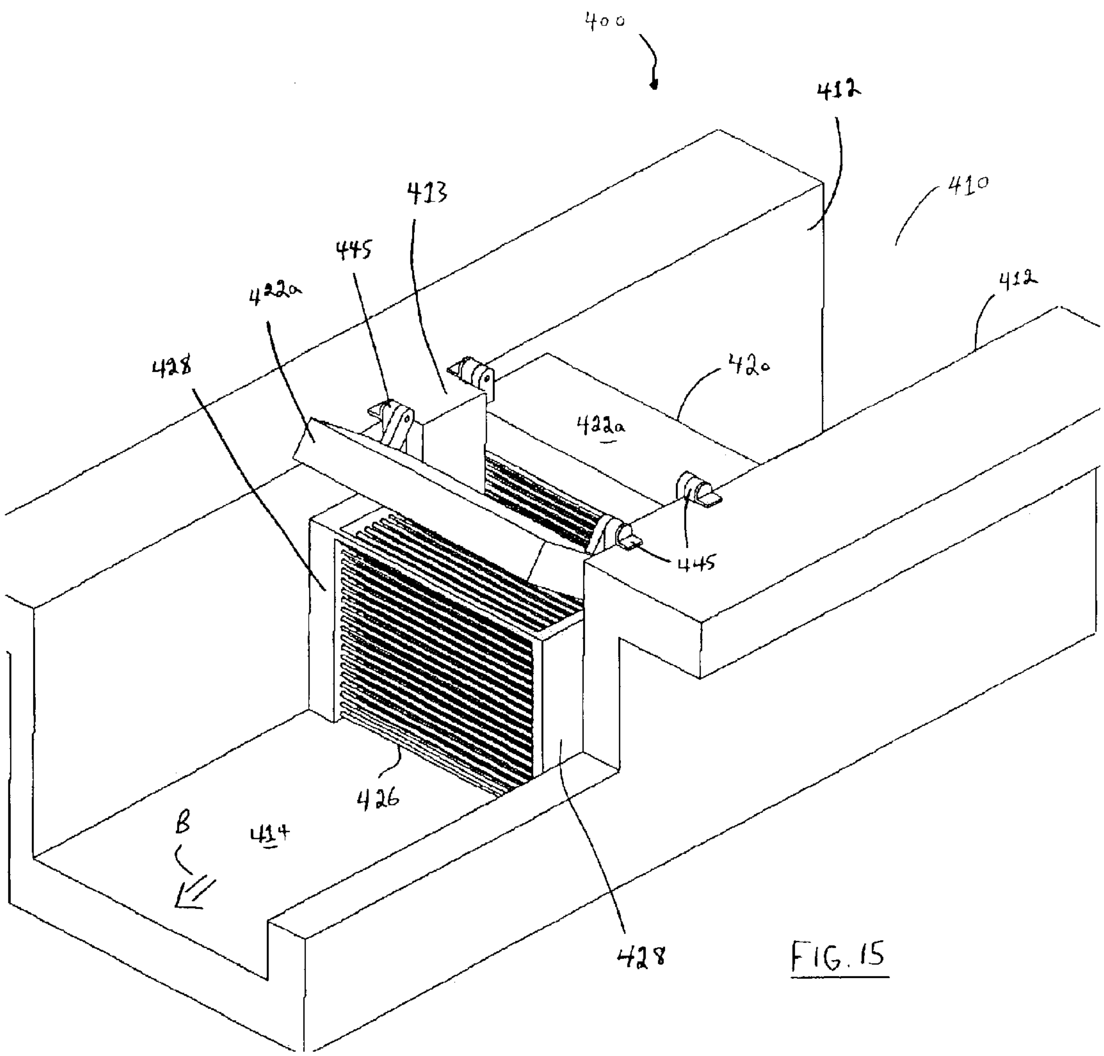
FIG. 15 illustrates a perspective view of a seventh embodiment of the present radiation source module shown in an open channel (partially cut away) of fluid flow.

With reference to FIG. 15, there is illustrated a modification of the embodiment illustrated in FIG. 14. In FIG. 15, like numerals designate like elements used in FIG. 14. The major difference between the two embodiments is that, in FIG. 14, cross-piece 422 is integrally connected to legs 428, whereas, in FIG. 15, cross-piece 422*a* may be pivoted independently of the combination of legs 428 and radiation source assemblies 426 disposed therebetween.

Those of skill in the art will recognize that it is possible to modify the embodiments of the fluid treatment system illustrated in FIGS. 14 and 15 to use a pair of substantially opposed juts 413 or to eliminate jut 413.

Throughout the specification, reference in general terms and in relation to the specifically illustrated embodiments has been made to the provision of seals between adjacent radiation source modules and spacer modules. The precise nature of these seals is not particularly restricted provided that they achieve the goals set out in the present specification. Thus, for example, in one embodiment, the seal may be a so-called "contact seal". Examples of suitable contact seals may include magnetic seals, electromagnetic seals, pneumatic seals, hydraulic seals, mechanical seals, hydrostatic seals and the like. Alternatively, in another embodiment, the seals may be non-contact seals which do not involve physical contact of two surfaces but, rather, cause a resistance to flow based upon a pressure difference across the opening. Examples of such seals are so-called narrow gap seals, labyrinth seals, fluidic seals, electric seals and the like. The preferred seals for use in the present fluid treatment system are contact seals. Of course, combinations of various seals can be used and are included within the scope of the present invention.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to dispose the ballast or other power supply for the radiation sources in the radiation source module (e.g., in top cross-piece 130 of radiation source module 120) as described generally in various of the Maarschalkerweerd #1 Patents described above. Further, it is possible to incorporate a mechanical or chemical/mechanical cleaning system in the radiation source module as described various published patent applications and issued patents of Trojan Technologies Inc. Still further, as described above, the specific embodiments illustrated can be modified to use alternate sealing systems which are inflatable or non-inflatable and made of a variety of materials. The selection of sealing materials and the placement thereof to obtain a sufficient seal is not particularly restricted. The important feature is that the combination of radiation source modules and seals operate collectively to provide a substantially fluid tight seal thereby defining a closed fluid treatment system having a zone which has substantially closed cross-section and in which is disposed at least a portion of at least one radiation source. Preferably, the substantially fluid tight seal may be achieved by an actuator which is capable of applying a lateral force to adjacent modules thereby creating the seal. Reversal of the actuator allows for servicing and/or extraction of one or more radiation source modules. Still further, it is possible to modify the illustrated embodiments to use weirs, dams and gates upstream, downstream or both upstream and downstream to optimize fluid flow upstream and downstream of the fluid treatment zone defined in the fluid treatment system of the present invention. Still further, it is possible to modify the illustrated embodiments to include sloped and/or stepped channel surfaces such as is disclosed in copending International patent application S.N. PCT/CA01/00297 filed on Mar. 12, 2001. Still further, it is possible to modify the illustrated embodiments to include mixers or mixing elements on the walls of the channel of the fluid treatment system and/or the radiation source module, for example as taught in one or more of U.S. Pat. Nos. 5,846,437, 6,015,229, 6,126,841 and 6,224,759, and in International patent application S.N. PCT/CA01/00816 filed on Jun. 6, 2001. Still further, it is possible to modify the illustrated embodiments to provide multiple banks of radiation source modules in hydraulic series. Still further, while the illustrated embodiments illustrate partial extraction of a single radiation source module in a bank of such modules, those of skill in the art will recognize that there might be situations where it is possible and/or desirable to fully extract, remove and replace one, some or all radiation source modules in a bank of such modules. Still further, while the embodiments illustrated in FIG. 5 utilizes dams or inclined surfaces to funnel fluid flow upstream and downstream of the radiation source modules, it is possible to utilize these dams or inclined surfaces only at the upstream or downstream side of the radiation source elements. Of course, dams or inclined surfaces of different design can be used upstream and/or downstream of the confining element. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment system comprising:

an open channel for receiving a flow of fluid, at least one radiation source module rotatably disposed in the channel, a surface of the at least one radiation source module confining fluid to be treated in a closed fluid treatment zone, the radiation source module comprising at least one radiation source assembly having a longitudinal axis disposed substantially transverse to the direction of fluid flow through the fluid treatment zone.

2. The fluid treatment system defined in claim 1, wherein the radiation source module comprises:

a support member, a radiation source assembly connected to the support member, the radiation source assembly comprising at least one elongate radiation source having a source longitudinal axis and a module-to-surface seal disposed on a first elongate surface of the module, the first elongate surface comprising a first longitudinal axis transverse to the source longitudinal axis, the seal operable to provide a substantially fluid tight seal between the first surface and a second surface which is adjacent to the first surface.

3. The fluid treatment system defined in claim 2, wherein the support member is disposed in a frame.

4. The fluid treatment system defined in claim 3, wherein the frame comprises a second support member opposed to the first support member, the first support member and second support member supporting opposed ends of the radiation source assembly, each of the first support member and the second support member comprising the seal for sealing against at least a portion of the channel.

5. The fluid treatment system defined in claim 4, wherein the frame further comprises a third support member interconnecting the first support member and the second support member.

6. The fluid treatment system defined in claim 5, wherein the third support member comprises an inter-module seal disposed on a surface thereof, the inter-module seal operable to provide a substantially fluid tight seal between the third support members of adjacent radiation source modules.

7. The fluid treatment system defined in claim 6, wherein the inter-module seal comprises a hydrostatic seal.

8. The fluid treatment system defined in claim 7, wherein the hydrostatic seal comprises a first seal member and a second seal member which are moveable with respect to one another such that, in the seal position, the first seal member and the second seal member are in an overlapped position along at least a portion of the hydrostatic seal.

9. The fluid treatment system defined in claim 4, wherein the frame further comprises a fourth support member substantially opposed to one another and interconnecting the first support member and the second support member.

10. The fluid treatment system defined in claim 9, wherein the module-to-surface seal is disposed on a surface of the fourth support member.

11. The fluid treatment system defined in claim 4, wherein the second support member comprises an extension member to facilitate removal and replacement of the module in a channel.

12. The fluid treatment system defined in claim 11, wherein the extension member, in two dimensions, comprises the shape of a sector.

13. The fluid treatment system defined in claim 11, wherein the extension member is moveable with respect to the second member.

14. The fluid treatment system defined in claim 11, wherein the extension member is pivotable with respect to the second member.

15. The fluid treatment system defined in claim 11, wherein the extension member is fixed with respect to the second member.

16. The fluid treatment system defined in claim 4, wherein the module-to-surface seal is disposed on a surface of the support member.

17. The fluid treatment system defined in claim 1, comprising a plurality of radiation source assemblies.

18. The fluid treatment system defined in claim 17, wherein the plurality of radiation source assemblies are disposed in a first plane.

19. The fluid treatment system defined in claim 17, wherein the plurality of radiation source assemblies are disposed in a first plane and a second plane which is transverse to the first plane.

20. The fluid treatment system defined in claim 17, wherein the plurality of radiation source assemblies are disposed in a first plane and a second plane which substantially orthogonal to the first plane.

21. The fluid treatment system defined in claim 2, wherein the seal comprises an expandable seal.

22. The fluid treatment system defined in claim 2, wherein the seal comprises a deformable seal.

23. The fluid treatment system defined in claim 1, further comprising a cleaning system for removing fouling materials from an exterior of the radiation source assembly.

24. The fluid treatment system defined in claim 23, wherein the cleaning system comprises a mechanical wiper moveable with respect to the exterior of the radiation source assembly.

25. The fluid treatment system defined in claim 23, wherein the cleaning system comprises cleaning sleeve for receiving a cleaning fluid.

26. The fluid treatment system defined in claim 23, wherein the cleaning system is moveable between a parked position and a cleaning position.

27. The fluid treatment system defined in claim 23, wherein the support member comprises a receptacle for receiving a least a portion of the cleaning system when the cleaning system is in the parked position.

28. The fluid treatment system defined in claim 3, wherein a power supply is disposed in the frame.

29. The fluid treatment system defined in claim 1, wherein the radiation source module is arranged such that the at least one radiation source assembly comprises a longitudinal axis disposed in a plane substantially parallel to the direction of fluid flow through the fluid treatment zone.

30. The fluid treatment system defined in claim 1, wherein the radiation source module is arranged such that the at least one radiation source assembly comprises a longitudinal axis disposed in a plane substantially perpendicular to the direction of fluid flow through the fluid treatment zone.

31. A fluid treatment system comprising:

an open channel for receiving a flow of fluid, at least one radiation source module disposed in the channel, the radiation source module comprising at least one radiation source assembly having a longitudinal axis disposed substantially transverse to the direction of fluid flow through the fluid treatment zone, the at least one radiation source module being configured to be rotatable from the channel in a plane which includes the direction of fluid flow through the fluid treatment zone.

32. The fluid treatment system defined in claim 31, wherein the at least one radiation source module pivotally removable from the channel in a plane which includes the direction of fluid flow through the fluid treatment zone.

33. The fluid treatment system defined in claim 31, wherein the at least one radiation source assembly has a longitudinal axis disposed substantially orthogonal to the direction of fluid flow through the fluid treatment zone.

34. The fluid treatment system defined in claim 1, wherein the radiation source module is pivotally removable from the channel about an axis of rotation.

35. The fluid treatment system defined in claim 34, wherein the axis of rotation is substantially parallel to the direction of fluid flow through the fluid treatment zone.

36. The fluid treatment system defined in claim 34, wherein the axis of rotation is transverse to the direction of fluid flow through the fluid treatment zone.

37. The fluid treatment system defined in claim 34, wherein the axis of rotation is substantially orthogonal to the direction of fluid flow through the fluid treatment zone.

* * * * *